June 29, 1954 L. WAINWRIGHT 2,682,452
EXTRACTION APPARATUS
Filed March 16, 1951 2 Sheets-Sheet 1

Inventor
LAWRENCE WAINWRIGHT
By Roland A. Anderson
Attorney

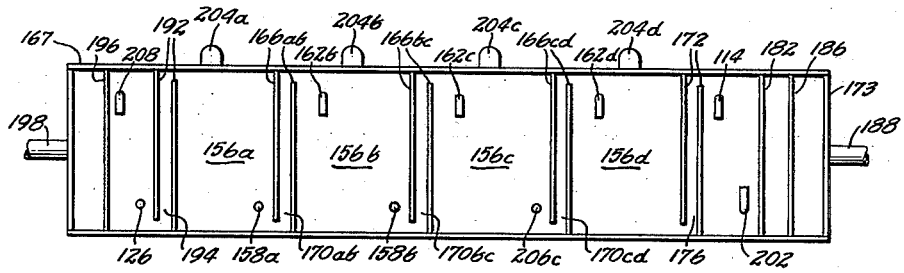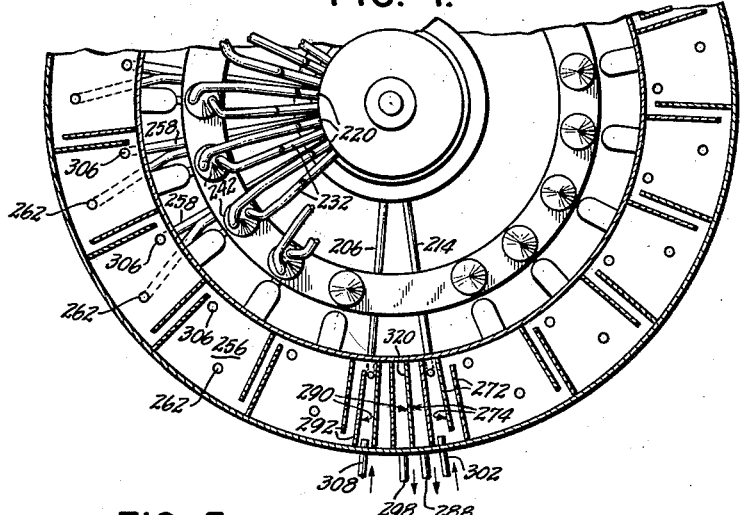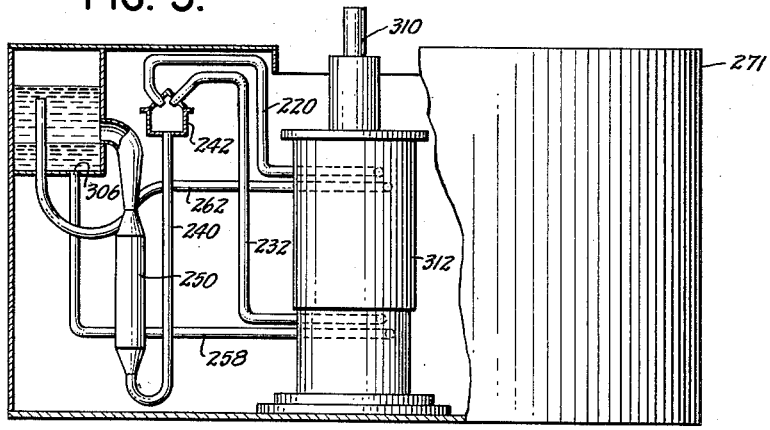

Patented June 29, 1954

2,682,452

UNITED STATES PATENT OFFICE 2,682,452

EXTRACTION APPARATUS

Lawrence Wainwright, Brooklyn, N. Y., assignor to the United States of America as represented by the United States Atomic Energy Commission Application March 16, 1951, Serial No. 216,043

3 Claims. (Cl. 23—270.5)

This invention relates to apparatus for continuously bringing into contact and separating two liquids, at least partially immiscible with each other and of different specific gravities, particularly for the purpose of countercurrent extraction.

Apparatus for bringing two immiscible liquids into contact with each other has been used for many years for the purpose of extracting from one of the liquids a valuable component dissolved therein. This type of process is particularly useful and effective in cases where distillation or evaporation of the solution containing the valuable component is expensive and a favorable distribution of the valuable component can be obtained with a selective solvent immiscible with the solution. In the description of this invention the term "solvent" is used to describe the liquid with which the valuable component is extracted; the term "solution" is used to describe the liquid from which the desired component is to be extracted; the term "extract" will be used to describe the solvent after it has been in contact with the solution; the term "raffinate" will be used to describe the treated solution.

One indispensable requisite of extraction apparatus is intimacy of contact between the phases to attain equilibrium as rapidly as possible. It has been found difficult to obtain both the necessary complete mixing of the two phases and the complete separation of the phases after mixing in a continuous, countercurrent manner. Generally, a compromise is made between the intimacy of contact between the phases and the desire for countercurrent flow and complete separation. Most recently, much effort has been expended in the design of rotating centrifugal countercurrent contactors. The principal difficulties with these is their initial cost and their rather complicated mechanical structure. Such extractors have a tendency to develop leaks through seals and bearings and to become clogged by any solids in the liquid stream. Where extractors are to be used under conditions which make the maintenance of the equipment impracticable, for example in handling radioactive fluids, the problems raised by these difficulties are multiplied.

It is an object of this invention to provide a simple, efficient, continuous extraction apparatus. Another object of the invention is to provide a compact countercurrent extraction apparatus in which the only moving parts are pumps. It is a somewhat more specific object of this invention to provide an extraction apparatus in which the immiscible liquids are separated at least partially by centrifugal force yet which uses no rotating equipment at all or none other than ordinary liquid pumps. A more specific object of the invention is to provide a multi-stage, countercurrent extraction apparatus in which the most intimate contact is obtained between the solvent and the solution to attain equilibrium rapidly and yet in which there are no moving parts other than ordinary liquid pumps. A still further object of the invention is to provide a multi-stage countercurrent extraction apparatus of the type described wherein each of the stages is an individual extractor, yet wherein the flow between the stages is simply and effectively controlled. Another object is to provide an extractor having little or no tendency to become clogged with solids in the liquid streams. Still another object is to provide an extractor which is capable of taking a considerable overload without flooding. Other objects will become apparent from the following specification.

The elements in each stage of the present extractor are arranged in a particular sequence with respect to the direction of flow of the two immiscible liquids. These elements are, in order, pumping means for solvent and solution; mixing means for solvent and solution; a conduit having a first portion whose diameter is such that the mixture of solvent and solution flows through it turbulently to transfer solute from solution to solvent; a stationary helical passage formed in a second portion of the conduit whereby extract is separated from raffinate; and means for partitioning the extract and the raffinate.

The objects and advantages of the apparatus will become apparent from the following description taken with reference to the accompanying figures in which:

Figure 3 is a diagrammatic plan view of the partitioning means shown in Figure 2 to illustrate particularly the manner in which interstage flow of liquids is equalized.

Figure 4 is a diagrammatic plan view, mostly in section, of a compact multi-stage extractor operating on the principles of the apparatus illustrated in the foregoing figures.

Figure 5 is a diagrammatic side elevation of the extractor shown in Figure 4 and is partly cut away to show the arrangement of the various parts of each extraction stage.

The following description will be limited to a specific embodiment of the invention. However, it is to be understood that this description is illustrative only and that it is not intended to limit the invention thereby.

Figure 1:
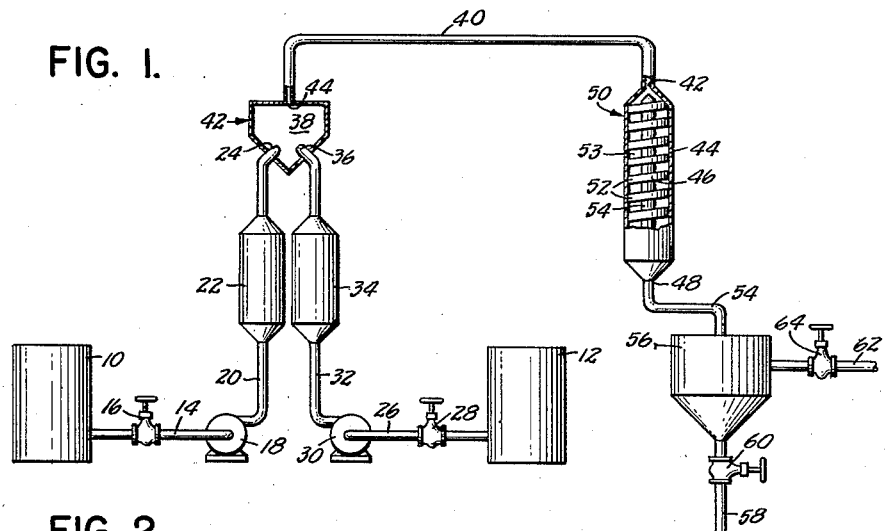
Figure 1 is a diagrammatic representation of a single-stage apparatus according to this invention for bringing into contact and separating a heavy and a light liquid immiscible with it.

Reference will first be made to the apparatus of Figure 1. In Figure 1, there are shown two containers 10 and 12, one containing a solution and the other a solvent. For convenience it will be assumed that container 10 holds the solution and container 12 holds a solvent which is heavier than the solution. The solution is drawn from container 10 through pipe 14 containing flow-control valve 16 into the intake of a pump 18. The pump may be of any convenient type which produces the proper flow rates and pressures. A small gear pump has been used for this purpose and found satisfactory, but centrifugal pumps and other types may also be used. The pump 18 discharges the solution through pipe 20 containing a rotameter 22 or other flow measuring device (such as an orifice, venturi, etc.) and through one nozzle 24 of jet mixer 42.

In a similar manner the solvent in container 12 is withdrawn through pipe 26 containing flow-control valve 28 by means of a pump 30 which discharges through pipe 32 containing a rotameter 34 into the second nozzle 36 of the jet mixer 42. The nozzles 24 and 36 both discharge in a small mixing chamber 38 so that the liquid streams impinge one upon the other. The combination of the two nozzles 24 and 36 discharging into a small chamber 38 at one end thereof, the chamber having an outlet port 44 at the other end thereof is referred to as the jet mixer 42. It has been found convenient to use an angle of between about 60 and 120° between the axes of the jet nozzles. However, this angle may be varied and the choice depends upon such factors as the rates of flow of the liquids, their tendency to form an emulsion, the sizes of the nozzles 24 and 36 and of the chamber 38 and similar factors. It is preferable also that one of the nozzles be withdrawn slightly with respect to the other so that one of the liquid streams impinges on the other. While this type of mixer is preferred because of the intimacy of contact obtained, other varieties of continuous mixers may be used. For example, both of the liquids may be metered into a single pump which performs both the pumping and mixing functions. While this is desirable in reducing the amount of equipment employed, the extent of mixing is more difficult to control. A relatively stable emulsion may be formed because of small changes in flow or the unavoidable introduction of an impurity which acts as an emulsifying agent. This difficulty can be avoided with the jet mixer which enables more accurate control.

Alternatively, a gas-, steam- or liquid-actuated eductor or jet pump may be used to pump the solvent and solution. However, the use of steam both heats and dilutes the liquids and can only be used where the presence of the added water is not objectionable. With a liquid-actuated eductor, one of the solutions and solvent is pumped through a jet nozzle and the pumped liquid entrains the other liquid. Such a system replaces the two rotary pumps and jet mixer with a single rotary pump and jet. However, this system of pumping and mixing is extremely difficult to control to avoid the formation of a stable emulsion.

The jet mixer 42 discharges the mixture of liquids through its outlet port 44 into an elongated cylinder or tube 40. The diameter of this tube is extremely important since it is here that the major part of the transfer of solute takes place to the solvent from the solution. The diameter of this tube is required to be such that the mixture of liquids flows through the tube in turbulent flow. The term "turbulent flow" is used in its engineering sense in contrast to streamline or Poiseuille flow. Whether the flow is turbulent or streamline depends upon the Reynolds number which in turn depends upon the diameter of the tube, the linear velocity, the density of the mixture of liquids and the viscosity of the mixture of liquids. The theory and methods of calculation are adequately described in standard engineering texts, for example, The Chemical Engineers' Handbook, McGraw-Hill, New York, 1941. The required diameter of the tube 40 can easily be calculated from the rates of flow of the solution and solvent and their physical properties. The relative rates of flow are determined from the distribution coefficient of the solute between solvent and solution and from the economic design of the particular extraction process. The length of transfer tube 40 depends upon the time required for the solution and solvent to reach equilibrium.

The transfer tube 40 discharges the mixture of raffinate and extract through the inlet port 42 of the helical separator 50 which comprises a stationary, generally tubular member 44 having an outlet port at 48 at the end opposite the inlet port and filled with an elongated screw member 46. The liquid mixture of raffinate and extract flowing into the separator 50 flows along the threads 52 of the screw member through a helical passage 53 formed by the wall of the tubular member 44 and the threads 52 and shank 54 of the screw member. It is desirable that the dimensions of the helical passage be chosen so that the rate of flow (and therefore the centrifugal force) is as great as possible. However, the velocity of the mixture flowing through the helical passage should not be so great that mixing conditions are maintained in the helical passage. The optimum velocity for any particular process can be determined by experiment.

The flow of a mixture of liquids through this helical passage causes the solvent phase to be separated at least partially from the solution by centrifugal force. That is to say, that the dispersion of one of the light and heavy liquids in the other, as formed in the mixing chamber 38 and maintained through the transfer tube 40, is broken in the helical separator 50 and the dispersed phase coalesces at least partially. The separated phases then flow together through pipe 54 into a decanter 56 where the phases can be partitioned completely. After settling by gravity, the relatively heavy extract is removed from the bottom of decanter 56 through pipe 58 containing the cut-off valve 60. The relatively light raffinate is removed from the upper part of decanter 56 through pipe 62 containing cut-off valve 64.

In essence the operation of a single-stage extractor is as follows: Metered streams of solvent and solution are pumped by individual pumps 30 and 18, respectively, through nozzles 36 and 24, respectively, into a small mixing chamber 38. The two streams of solvent and solution discharged from the nozzles 36 and 24 inpinge one upon the other in the chamber 38 to disperse one of them in the other. The mixture of solvent and solution then passes through transfer tube 40 in turbulent flow to effect the major part of transfer of the solute from the solution to the solvent. The mixture is discharged from the transfer tube 40 into the helical separator 50 wherein the mixture flows through a helical passage 53 formed by an elongated screw member 46 and the inner wall of the tube 44. The centrifugal force developed in the helical passage causes the dispersed phase to coalesce at least partially and the separated mixture of extract and raffinate are partitioned in a decanter 56. It will be noted that the transfer tube 40 and the separator 50 form a continuous conduit between mixing chamber 38 and the decanter 56. One portion of this conduit has a diameter such that the mixture of liquids flows therethrough in turbulent flow, and a second portion is filled with the screw member 46 to form a helical passage with the wall of the second portion of the conduit. It will be noted also that the solvent and solution flow cocurrently through the single-stage apparatus.

Figure 2:
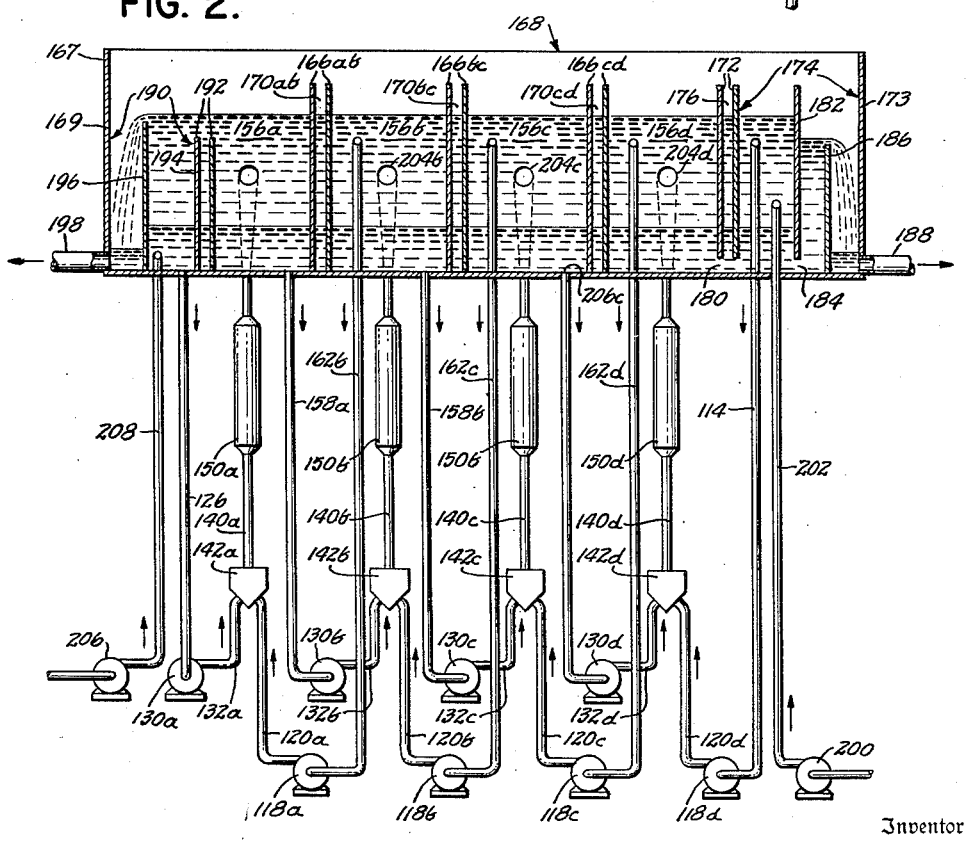
Figure 2 is a diagrammatic representation showing the arrangement of four stages of apparatus of Figure 1, and it particularly illustrates the countercurrent interstage connections and a continuous means for partitioning light and heavy liquid and for equalizing interstage flow.

In Figures 2 and 3, the arrangement of a plurality of stages (four in the embodiment shown) in a countercurrent extractor is illustrated diagrammatically. The functions and structures of the corresponding parts are identical with those described with reference to Figure 1 for a single stage.

The four stages shown are interconnected through a continuous decanter or partitioning means 168. The continuous decanter comprises a box-like vessel 167 divided into six interconnected compartments: settling chambers 156a, 156b, 156c and 156d, corresponding to the four stages, A, B, C and D, and decanter chambers 190 and 174 outwardly of the settling chambers for partitioning continuously the light and heavy liquids respectively.

The settling chambers 156a, b, c, d are separated from each other by pairs of spaced, upright baffles 166ab, 166bc and 166cd, the reference letters corresponding to the adjoining settling chambers. Each of the baffles 166 is sealed to the floor and only one wall of the vessel 167 so that the chambers 156 are interconnected through passages 170ab, 170bc and 170cd between the pairs of baffles 166ab, 166bc and 166cd, respectively. The interconnections between the settling chambers 156 within continuous decanter 162 are made to equalize the interstage pumping rates. These interconnections also prevent flooding of the extractor under any but the most severe overload conditions.

The decanter chambers 190 and 174 at opposite ends of vessel 167 are employed to separate continuously the extract and raffinate. The heavy liquid decanter chamber 174 into which the light liquid feed is admitted through pipe 202 (as presently described) is separated from settling chamber 156d by means of a pair of spaced, upright baffles 172. In a manner similar to baffles 166, the baffles 172 are separated by a passage 176 connecting decanter chamber 174 and adjoining settling chamber 156d. However, in order to separate the lighter from the heavier of the two liquid phases, the baffles 172 are raised above the floor of vessel 167 to provide a passage 180 through which the heavy liquid product of chamber 156d flows into the decanter chamber 174. To partition the heavy liquid from the light liquid, the decanter chamber 174 is divided by an upright baffle 182 sealed to opposite walls of the vessel 167 with a space below the baffle providing a passage 184. As long as the interface between the liquids is maintained above the bottom edge of baffle 182, only heavy liquid can flow through passage 184. Between baffle 182 and the end wall 173 of vessel 167, there is a weir or dam 186 over which the heavy liquid flows from the passage 184. The dam 186 serves to maintain a head of heavy liquid between it and baffle 182 to maintain the interface level and thereby to prevent flow of light liquid through passage 184. The heavy liquid is removed from chamber 174 through outlet pipe 188 in end wall 173.

At the opposite end of the vessel 167 adjacent chamber 156a, means are provided for decanting the light liquid from the heavy liquid. The light liquid decanter means comprises a decanter chamber 190 formed between a pair of upright spaced baffles 192 separating chamber 190 from chamber 156a and the end wall 169 of the vessel 167. The space between the baffles 192 forms a connecting passage 194 between chamber 190 and chamber 156a similar in structure, purpose and effect to passages 170 and 176. The height of the baffles 192 is such that light liquid product from chamber 156a may flow in volume over the baffles in a manner similar to a weir or dam. However, since heavy liquid feed is admitted to chamber 190 (as will be presently described) and since chambers 190 and 156a are interconnected, a dam 196 is provided between end wall 169 and baffles 192. The light product liquid flows over the dam 196 and is removed through outlet pipe 198 in end wall 169.

The arrangement of the equipment in the four stages and the interstage connections are shown principally in Figure 2. The light liquid feed is delivered by pump 200 through pipe 202 into the heavy decanting chamber 174 between baffle 182 and baffles 172. The heavy liquid product is removed from chamber 174 through passage 184, over dam 186 and out through pipe 188 as already described. The light liquid feed is removed from chamber 174 through pipe 114 by means of pump 118d which discharges in stage D through pipe 120d into the jet mixer 142d. Here the light liquid feed is mixed with heavy liquid from settling chamber 156c of the next stage, C, as presently described. The mixture passes successively through the transfer tube 140d and the helical separator 150d and is discharged through inlet port 204d into the chamber 156d. Here the heavy liquid settles out from the light liquid and flows through passage 180 into decanter chamber 174.

The light liquid is withdrawn from chamber 156d through pipe 162d by means of pump 118c of stage C. The pump 118c discharges light liquid through pipe 120c into jet mixer 142c where it is mixed with heavy liquid withdrawn from chamber 156b of the next stage, B, as presently described. The mixture flows from mixer 142c successively through transfer tube 140c and helical separator 150c and is discharged through inlet port 204c into chamber 156c where the light and heavy liquids separate. The heavy liquid is withdrawn from chamber 156c through outlet port 206c in the chamber floor by means of pump 130d of stage D and is discharged through pipe 132d into the jet mixer 142d.

The light liquid in chamber 156c is withdrawn through pipe 162c by means of pump 118b of stage B and is discharged through pipe 120b into the jet mixer 142b. Here the light liquid is mixed with heavy liquid pumped from chamber 156a of stage A, as presently described. The mixture of liquids formed in mixer 142b flows successively through transfer tube 140b and helical separator 150b and is discharged through inlet port 204b into chamber 156b. The heavy liquid is removed from chamber 156b through pipe 158b by means of pump 130c (of stage C) which discharges through pipe 132c into the jet mixer 142c.

The light liquid separated in chamber 156b is withdrawn through pipe 162b by means of pump 118a of stage A and is discharged through pipe 120a into jet mixer 142a. In the mixer 142a the light liquid from stage B is mixed with heavy feed liquid from decanter chamber 190 and the mixture flows successively through transfer tube 140a and helical separator 150a into chamber 156a. The heavy liquid separated in chamber 156a is withdrawn through conduit 158a by means of pump 130b of stage B and is discharged through conduit 132b into jet mixer 142b.

A portion of the light liquid in chamber 156a overflows the baffles 192 into decanter chamber 190 where it is partitioned as the light product by overflowing the dam or weir 190, as already described. The heavy liquid feed is pumped into the decanter chamber 190 through pipe 208 by means of pump 206 and is withdrawn from the chamber 190 through pipe 126 by means of pump 130a (of stage A) which discharges the heavy feed through pipe 132a into the jet mixer 142a.

In the multi-stage apparatus, it is preferable that all of the pumps be powered by a single prime mover. As described with respect to the single-stage apparatus of Figure 1, the jet mixer and pumps of each stage may be replaced by a pump which serves not only to pump but also to mix the heavy and light liquids. However, it is preferred to use individual pumps and jet mixers.

In tests of a four-stage apparatus constructed as shown in Figures 2 and 3, hexone was used to extract acetic acid from water, and a hexone solution of acetic acid was washed with water to extract the acetic acid. Small gear pumps were used to pump the liquids. The axes of the nozzles of the jet mixers 142 were set at about 60° to each other and the nozzle which discharged the hexone into the mixing chamber was slightly withdrawn with respect to the water nozzle so that the hexone stream impinged upon the water stream. The mixing chambers were approximately 1" in diameter and ¾ of an inch long and the nozzles were about ⅛" in diameter. It was found that under the conditions used the hexone phase was usually dispersed in a continuous aqueous phase. Each transfer tube consisted of 4 feet of ¼" "Saran" tubing which is approximately $\frac{3}{16}$ of an inch in inside diameter. Each helical separator consisted of a brass tube with an inside diameter of ¾" containing a brass screw member with two acme-style screw threads to the inch and with an outside diameter of ¾". The shank of the screw member was ⅛" in diameter and the threads were each $\frac{1}{16}$" thick. This apparatus, when continuously treating 1 to 1.5 gallons per minute, was found to be equivalent to approximately four theoretical stages. That is, in each stage of the apparatus complete equilibrium was attained as well as complete separation.

In Figures 4 and 5, there is shown an extremely compact eighteen-stage extractor operating on the principles already described. In Figures 4 and 5, the partitioning means 268 comprises an annular vessel 267 positioned against the wall of a generally cylindrical housing 271. The vessel 267 is divided into settling chamber 256 by pairs of spaced upright baffles 266 and has decanter chambers 290 and 274 for partitioning the light and heavy liquids respectively. The chambers 290 and 274 are positioned adjacent each other with a fluid-tight wall 320 between them. The inlet pipe 308 introduces the heavy liquid feed into the light-liquid decanting chamber 290 similar to chamber 190 for partitioning the light liquid product. A pair of baffles 292 similar in structure and function to baffles 192 separates decanting chamber 290 from the adjacent settling chamber 256. The light liquid product is removed from chamber 290 through pipe 298. The light liquid feed is introduced through pipe 302 into the decanter chamber 274 similar to decanter chamber 174. The heavy liquid product is removed through pipe 288 from the heavy liquid decanter chamber 274. Decanter chamber 274 is separated from adjacent settling chamber 256 by a pair of upright spaced baffles 272, identical in function and structure to baffles 172. The arrangement of the baffles, conduits and dams in chambers 256, 274 and 290 is the same as that previously described and shown in Figures 2 and 3 with respect to chambers 156, 174 and 190, the chambers 256 being similarly interconnected by passages 270 between the pairs of baffles 266.

At the axis of the annular vessel 267, there is a pump housing 312 containing a plurality of pumps mounted on a single shaft 310 and powered by a single prime mover (not shown). The pumps are serially arranged within the housing in two groups with the heavy liquid pumps together below the light liquid pumps. The light and heavy liquid feed pumps (equivalent to pumps 200 and 206 of Figure 2) may also be included within housing 312. Light and heavy liquid feed are withdrawn from chambers 274 and 290 through conduits 214 and 226 respectively.

In each stage, a heavy liquid pump withdraws heavy liquid from a port 306 in the floor of a settling chamber 256 through a pipe 258 and discharges the liquid through a pipe 232 into the jet mixer 242 of the next adjacent stage upstream with respect to the flow of heavy liquid through the extractor. The light liquid delivered through pipe 220 to that mixer 242 is withdrawn through a pipe 262 from a chamber 256, two chambers removed from the chamber supplying heavy liquid to mixer 242. The jet mixer 242 discharges through a transfer tube 240 and a helical separator 250 in succession and into the chamber 256 between the chambers from which the light and heavy liquids respectively were withdrawn. The countercurrent piping connections between stages are identical to those already described with reference to Figures 2 and 3. That is to say that into each of the chambers 256 (fed through a jet mixer 242, a transfer tube 240 and a helical separator 250) there is introduced a stream consisting of heavy liquid from the next preceding stage and light liquid from the next succeeding stage.

The eighteen-stage extractor shown in Figures 4 and 5 is about five feet in diameter and 2.5 feet high, exclusive of the prime mover for the pumps. The extractor is capable of treating approximately 8 gallons per minute. This is to be compared with an equivalent packed column having a diameter of about 1 foot and a height of about 30 to 50 feet. The advantages are manifest.

Since many embodiments might be made of the present invention and since many changes might be made in the embodiment described, it is to be understood that the foregoing description is to be interpreted as illustrative only and not in a limiting sense.

I claim:

1. Multistage continuous liquid-liquid contact apparatus for treating a solution containing a solute with a solvent at least partially immiscible with the solution, said solution and solvent having different densities, said apparatus comprising a horizontally arranged annular container having spaced baffles therein positioned to divide said container into a number of interconnected compartments corresponding to the number of stages, each of said compartments having a pair of vertically spaced upper and lower outlet connections and an intermediate inlet connection, a series of transfer pumps, each of a plurality of the compartments of said container being connected to a first, second and third pump of said series, a series of mixing devices each of which is connected to the discharge sides of one of said first pumps and one of said second pumps and to the inlet connection of one of said compartments, a conduit connecting the lower outlet connection of said one compartment and the suction side of one of said third pumps, conduits connecting the suction sides of said first and second pumps with the lower outlet connection and upper outlet connection respectively of the two compartments adjacent to said one compartment, the first pump associated with said one compartment being the third pump of the next preceding compartment and the third pump associated with said one compartment being the first pump of the next succeeding compartment, said pumps being located substantially at the central axis of said annular container whereby the conduits interconnecting said pumps and said compartments are of substantially equal length.

2. Multistage contact apparatus as claimed in claim 1 and wherein the conduits interconnecting the mixing devices and compartments contain elongated screw members defining with the conduit walls helical passages to give the liquid mixture flowing therethrough a whirling motion and thereby cause the disperse phase of the mixture to coalesce at least partially.

3. Multistage contact apparatus according to claim 1 wherein the pumps of said series are mounted on a common shaft aligned with the central axis of said annular container.

References Cited in the file of this patent

UNITED STATES PATENTS

| Number | Name | Date |
|---|---|---|
| 1,756,026 | Huff | Apr. 29, 1930 |
| 2,076,126 | Guinot | Apr. 6, 1937 |
| 2,192,094 | Moore | Feb. 27, 1940 |
| 2,250,976 | Van Dijck | July 29, 1941 |
| 2,381,760 | Latham | Aug. 7, 1945 |
| 2,432,308 | Goodyer | Dec. 9, 1947 |